(12) United States Patent
Marsland

(10) Patent No.: US 6,528,776 B1
(45) Date of Patent: Mar. 4, 2003

(54) ELECTRO OPTIC CONVERTER HAVING A PASSIVE WAVEGUIDE AND EXHIBITING IMPEDANCE MISMATCH

(75) Inventor: Robert A. Marsland, Madison, WI (US)

(73) Assignee: New Focus, Inc., San Jose, CA (US)

( * ) Notice: Subject to any disclaimer, the term of this patent is extended or adjusted under 35 U.S.C. 154(b) by 13 days.

(21) Appl. No.: 09/716,011

(22) Filed: Nov. 18, 2000

Related U.S. Application Data
(60) Provisional application No. 60/166,661, filed on Nov. 19, 1999.

(51) Int. Cl.[7] .................................................. G01J 1/42

(52) U.S. Cl. .............................. 250/208.2; 250/208.1; 250/227.11; 385/12; 385/14; 385/15; 385/129; 385/130

(58) Field of Search ...................... 250/208.2, 227.11, 250/208.1, 227.31, 227.32; 385/12, 14, 15, 129, 130, 141

(56) References Cited

U.S. PATENT DOCUMENTS

| | | | | |
|---|---|---|---|---|
| 4,381,139 A | * | 4/1983 | Alferness | 350/96.14 |
| 4,770,483 A | | 9/1988 | Ridgway | 350/96.13 |
| 5,004,313 A | * | 4/1991 | Ty Tan et al. | 350/96.14 |
| 5,006,906 A | * | 4/1991 | Deri | 357/16 |
| 5,032,717 A | | 7/1991 | Roose | 250/227.11 |
| 5,270,532 A | | 12/1993 | Hietala et al. | 280/214.1 |
| 5,404,006 A | | 4/1995 | Schaffner et al. | 250/208.2 |
| 5,572,014 A | | 11/1996 | Wu et al. | 250/208.2 |
| 5,661,741 A | | 8/1997 | Kakimoto | 372/46 |
| 6,069,729 A | * | 5/2000 | Gill et al. | 359/245 |
| 6,175,321 B1 | | 1/2001 | Heflinger | 341/137 |
| 6,278,820 B1 | * | 8/2001 | Hayes | 385/39 |
| 6,310,700 B1 | * | 10/2001 | Betts | 359/2 |

OTHER PUBLICATIONS

I.P. Kaminow, T.L.Kock, Optical Fiber Telecommunications IIIB, Academic Press, San Diego, CA, 1997, p. 124.

Ginzton, Hewlett, Jasberg, and Noe, "Distributed Amplification," Proc.IRE, 1948, pp. 956–969.

R.B Welstand, S.A. Pappert, C.K. Sun, J.T. Zhu, Y.Z. Liu, and P.K. Yu, "Dual–function Electroabsorption Waveguide Modulator/Detector for Optoelectronic Transceiver Applications," IEEE Photon. Technol. Lett., 8 No. 11, 1996, pp. 1540–1542.

* cited by examiner

Primary Examiner—Stephone Allen
Assistant Examiner—Christopher W. Glass
(74) Attorney, Agent, or Firm—Meyertons Hood Kivlin Kowert & Goetzel, P.C.; B. Noël Kivlin

(57) ABSTRACT

The present invention provides a velocity matched distributed photodetector/modulator (VMDP) for converting between an optical signal and an electrical signal. The converter has twice the theoretical efficiency of any prior art device. The converter wave-guide core is of uniform cross-sectional thickness and composition along the optical path, which makes it easy to fabricate.

The converter includes a passive optical waveguide and a plurality of photodiodes. The photodiodes optically couple in series with the passive optical waveguide and electrically couple in parallel with one another to convey the electrical signal there between. The photodiodes exhibit impedance mismatches that generate reflections of the electrical signal, which contribute to a cancellation of reverse traveling portions of the electrical signal. The passive optical waveguide may be tuned to a band gap at which it exhibits transparency to a characteristic wavelength of the optical signal at a field strength less than a first electrical field strength and absorption of the optical signal at the field strength greater than the first field strength. The photodiodes are electrically biased to generate within the passive optical waveguide localized electric fields. The field strength of these fields is greater than the first electrical field strength, to optically couple the photodiodes with the passive optical waveguide.

16 Claims, 5 Drawing Sheets

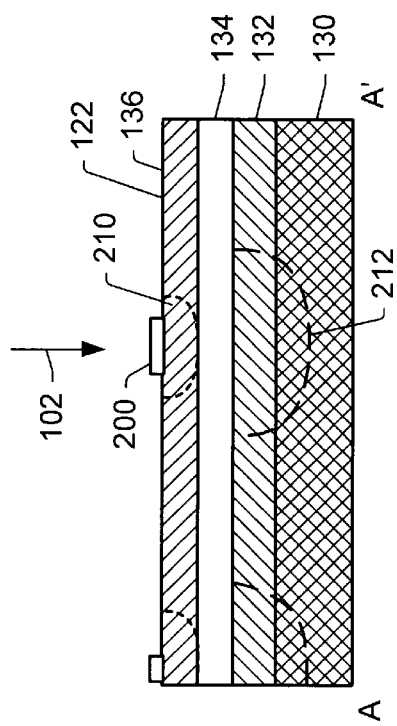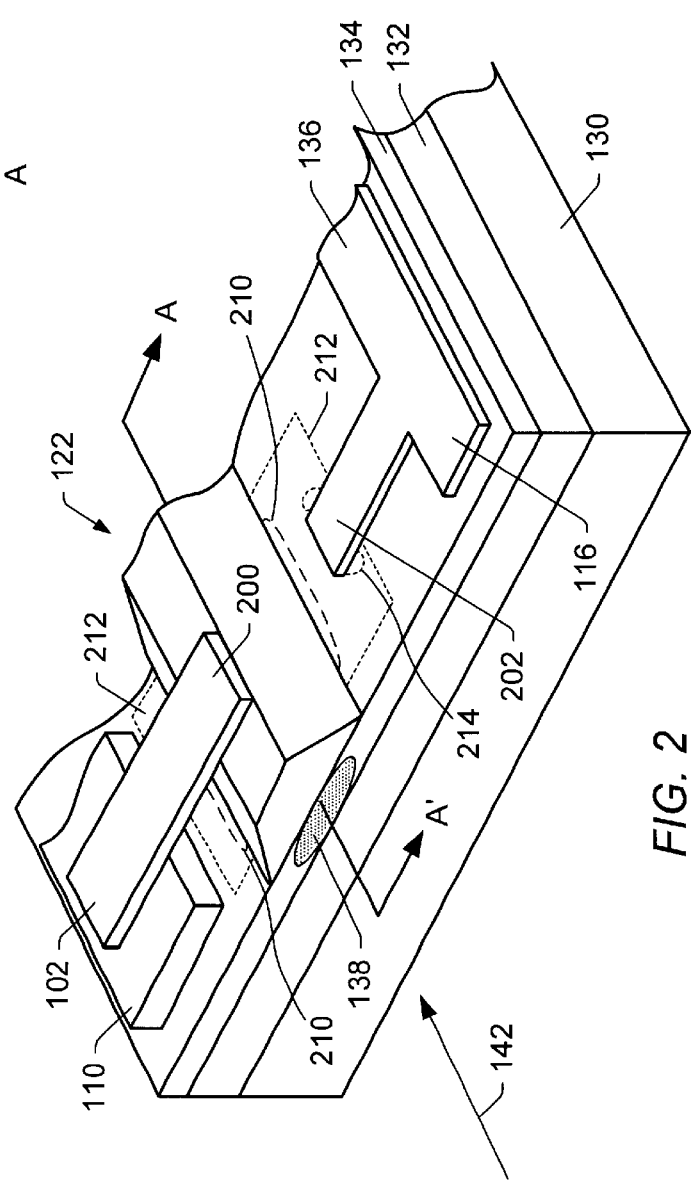

ELECTRO OPTIC CONVERTER HAVING A PASSIVE WAVEGUIDE AND EXHIBITING IMPEDANCE MISMATCH

CROSS-REFERENCE TO RELATED APPLICATION

This application claims priority from Provisional Application Number: 60/166,661, entitled "VELOCITY MATCHED DISTRIBUTED PHOTODETECTOR" filed on Nov. 19, 1999 which is incorporated herein by reference in its entirety.

STATEMENT REGARDING FEDERALLY SPONSORED RESEARCH

The U.S. Government has rights in this invention as provided for by the terms of contract No. DAAH01-98-C-R017 awarded by the Defense Advanced Research Projects Agency (DOD) Electronic Technology Office (ETO) ARPA Order No. D611 Amdt 27 Issued by U.S. Army Aviation and Missile Command to Focused Research Inc.

BACKGROUND OF THE INVENTION

1. Field of the Invention

This invention generally relates to electro-optic converters and in particular to integrated optical waveguides and photodetectors/modulators for converting between optical and electrical signals.

2. Description of the Related Art

Ultra fast photodetectors and optical modulators are required for high frequency fiber optic links. However, ultra fast photodetectors/modulators tend to saturate at very low optical power because of the need for small detector sizes and high optical power density. Velocity-Matched-Distributed-Photodiodes (VMDP) have been developed to overcome these problems. In a VMDP high power handling capability is achieved by combining a string of photodetectors. The photocurrent signals from each detector add in phase when the velocities of the optical wave that illuminates the photodetectors and the velocity of the electrical wave on the transmission line coupled to the photodetectors are equal.

U.S. Pat. No. 5,572,014 entitled "Highly Efficient, Ultra fast Optical-to-Electrical Converter and Method for Operating Same" and Issued on Nov. 5, 1996 discloses one such VMDP device. In the '014 device a plurality of identical PIN diodes are arrayed along a GaAs waveguide, which also serves as the intrinsic layer of the PIN diodes. The diodes are electrically coupled with a transmission line, and the velocity of the electrical signal propagating along the transmission line is matched with the group velocity of the optical wave in the waveguide by an appropriate choice of the capacitance of each of the photodiodes. The device offers the promise of a VMDP with a high degree of integration. There are, however, several drawbacks to this and other prior art devices. First, their efficiency is limited to a maximum of 50%. Second, they are difficult to fabricate. The first limitation results from the requirement that the traveling wave structure set up in the transmission line by the photodetectors requires two ports of termination, i.e., the actual load and a dummy load which matches the actual load in resistance. Second, in an effort to couple the waveguide with the photodetectors, discontinuities are introduced into the waveguide. In the case of the above mentioned '014 patent, the waveguide tapers to a very thin layer or quantum well in the intrinsic layer of each photodiode. This tapering of the waveguide introduces scattering in the light propagating along the waveguide, which further reduces the efficiency of the device. Additionally, the variations in the core thickness are not easily achieved and may result in optical discontinuities or contamination.

What is needed is an VMDP with improved efficiency, and manufacturability.

SUMMARY OF THE INVENTION

The present invention provides a VMDP converter for converting between an optical signal and an electrical signal. The converter has twice the theoretical efficiency of any prior art device. The converter has improved manufacturability when compared with prior art devices since the wave guide core is of substantially uniform cross-sectional thickness along the optical path. Additionally, current contribution from individual photodetectors may be individually tuned to more evenly distribute the opto-electric conversion process.

In an embodiment of the invention the converter for converting between an optical signal and an electrical signal includes a passive optical waveguide and a plurality of photodiodes. The passive optical waveguide conveys the optical signal. The photodiodes optically couple in series with the passive optical waveguide and electrically couple in parallel with one another to convey the electrical signal there between. The photodiodes exhibit impedance mismatches with respect to one another. These mismatches generate reflections of the electrical signal which contribute to a cancellation of reverse traveling portions of the electrical signal.

In an alternate embodiment of the invention the converter also includes a passive optical waveguide and photodiodes. The passive optical waveguide includes a band gap tuned to exhibit substantial transparency to a characteristic wavelength of the optical signal at a field strength less than a first electrical field strength and to exhibit substantial absorption of the optical signal at the field strength greater than the first field strength. The photodiodes are displaced from one another along the passive optical waveguide. The photodiodes are electrically coupled in parallel with one another to convey the electrical signal there between. The plurality of photodiodes exhibit bias voltages sufficient to generate within said passive optical waveguide localized electric fields with a field strength greater than the first electrical field strength to optically couple the photodiodes with the passive optical waveguide.

In an alternate embodiment, a method for converting between an optical signal in a passive optical waveguide and an electrical signal is disclosed. The method includes:

adjusting a bandgap of the passive optical waveguide to exhibit substantial transparency to a characteristic wavelength of the optical signal at an electrical field strength less than a first electrical field strength and to exhibit substantial absorption of the optical signal at an electrical field strength greater than the first electrical field strength; and generating within said passive optical waveguide localized regions with electric fields exhibiting an electrical field strength greater than the first electrical field strength; to couple the optical signal with the electrical signal.

BRIEF DESCRIPTION OF THE DRAWINGS

The present invention will be readily understood by the following detailed description in conjunction with the FIG. 1 is an isometric view of an electro-optic converter for electro-optic signal conversion.

FIG. 2 is an exploded isometric view of a portion of the converter in FIG. 1 showing a waveguide and a photo diode.

FIG. 3 is a cross-sectional elevation of the waveguide and photodiode shown in FIG. 2.

DETAILED DESCRIPTION OF THE INVENTION

The present invention provides a velocity matched distributed photodiode (VMDP) for converting between an optical signal and an electrical signal. The converter has twice the theoretical efficiency of any prior art device. The converter has improved manufacturability when compared with prior art devices since the wave guide core is of substantially uniform cross-sectional thickness along the optical path. Additionally, current contribution from individual photodetectors may be individually tuned to more evenly distribute the opto-electric conversion process.

Figure 1:
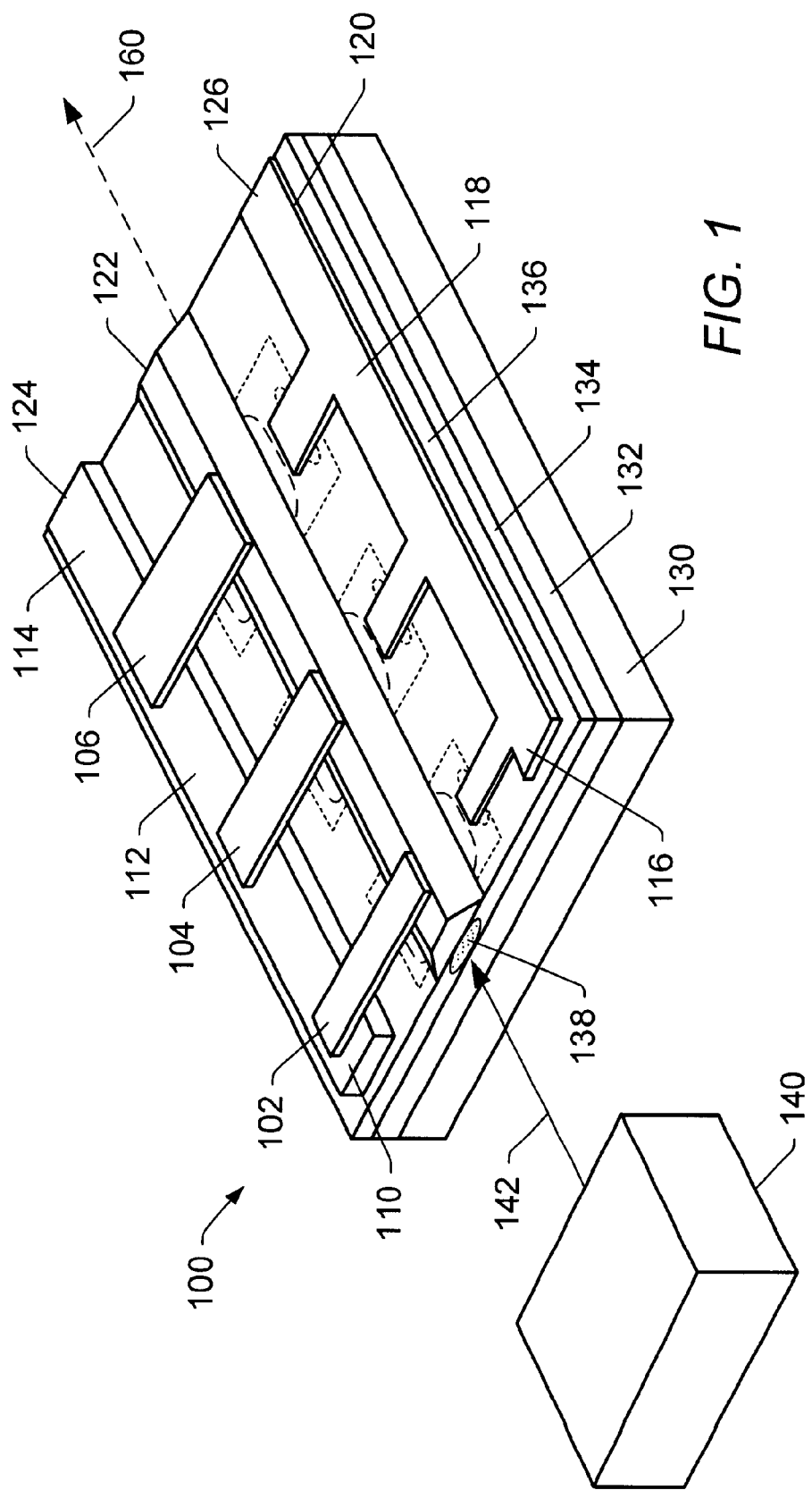

FIG. 1 is an isometric view of an electro-optic converter for electro-optic signal conversion. An optical source 140, e.g., an optical fiber, laser or gain medium, is shown emitting an optical beam 142 at the passive optical waveguide portion 138 of an electro-optic converter 100 in accordance with an embodiment of the current invention. The electro-optic converter includes a string of photodiodes 102, 104, 106 arrayed along the length of the optical waveguide from the proximal end of the converter at which light enters to the distal end respectively. The photodiodes (e.g., PIN type) are coupled in parallel to one another via transmission lines 112, 118. Transmission lines 112 and 118 have proximal end portions 110 and 116 and distal end portions 114 and 120, respectively. The load is coupled via transmission lines 124 and 126 to the distal ends 114, 120 of the transmission lines.

In an embodiment of the invention in which the converter serves as a photodetector, an optical signal modulated on optical beam 142 is detected in detectors 102–106. The individual electron-hole pairs generated by photon absorption in each photodetector are converted to electrical currents in the transmission line. These are velocity matched. Velocity matching is achieved by selecting individual reactances of the photodiodes together with (i.e. and/or) the transmission line portions connecting each of the photodiodes to substantially match a group velocity of the electrical signal with a group velocity of the optical signal within said passive optical waveguide. The resultant electrical signal is output on lines 124–126. In an embodiment of the invention no dummy load on the proximal end of the transmission line is required (See FIG. 6 and accompanying text). This effect may be achieved by designing photodiodes and/or transmission lines with impedance mismatches/steps. The PIN type photodiodes together with the transmission line portions joining each photodiode to the next may decrease in impedance along the optical pathlength. These variations in impedance may be produced by the design of the photodiodes, the transmission line portions or both. Where these impedance mismatches/steps are properly scaled it is possible to double the theoretical efficiency of the device from the maximum of 50% for prior art devices up to 100% for this device (See FIG. 6 and accompanying text). This advantage results from scaling the individual impedance mismatches from one photodiode and transmission line portion to the next so as to generate reflections of the electrical signal which contribute to a cancellation of reverse traveling portions of the electrical signal. This obviates the need for the dummy load found in the prior art on proximal end of the transmission line. Instead as is shown in FIG. 1 the only load connected to the transmission line is coupled via lines 124–126 at the distal end of the transmission lines 114, 120 respectively.

In an alternate embodiment of the invention in which the converter modulates an optical signal with an electrical signal the operation is reversed from that discussed above. An electrical signal coupled to the transmission lines at the proximal end points 110, 116 modulates the photodiodes 102–106, which in turn modulate the optical beam 142 such that the output is a modulated optical beam 160 which exits the distal end of the waveguide. In this embodiment, a termination (i.e., a dummy load) may be needed at the distal end points 114, 120 and or the wires 124, 126 connected thereto.

The combined transmission line, waveguide, and photodetectors may be fabricated on a semiconductor substrate such as InP or GaAs. The layout of the chip exhibits continuity of gross geometries along the optical path length. For example the P portion of the photodiodes is formed from a continuous ridge feature 122 extending the length of the converter along the optical path. The continuous nature of the ridge avoids gross discontinuities along the boundary of the waveguide which would scatter light traveling along the waveguide. The ridge may be fabricated from InGaAsP or other suitable material such as InP. The refractive index of the ridge is selected to be lower than that of the core so that it serves as a cladding for the core, thereby helping to contain light in the core. To generate discrete P regions along the ridge a standard P type dopant is implanted locally in the regions which define each photodiode. Metal bridges span the gap over the surface of the device between the P contacts of the PIN photodiodes and the associated transmission line 112.

Underneath the ridge 122 an etch stop layer 136 may be added to protect the underlying substrate features. This layer may be fabricated from InP or other suitable material. Beneath the etch stop is the core 134 of which the waveguide is a part. This layer has substantially planar upper and lower surfaces which extend the length of the optical path from the proximal end at which light enters to the distal end. It has a substantially higher refractive index than either the P layer 122 or the lower layer 132 both of which serve as cladding layers of r the core. The core also forms the intrinsic "I" layer of each of the photodiodes as well. The core may be fabricated from more than one layer of InGaAsP. An upper portion of the core would have the bandgap precisely tuned so that variations in electrical field strength resulting from the bias applied to the photodiodes will create localized regions of relatively high electrical field strength along the optical path beneath each photodiode. In these regions the core is substantially absorbing whereas it remains transmissive outside these regions. It is in these regions that electron hole pairs will tend to be generated. The lower portion of the core would also be InGaAsP tuned to shorter wavelength than the upper layer so it tended to be less effected by variations in electrical field strength of the photodiodes. The material composition of the waveguide and associated core many depend on the wavelength of light being processed. Other suitable materials for the core include but are not limited to: GaAs, InGaAs, AlGaAs and InAlAs. Beneath the core is a lower cladding layer 132 which may be InGaAsP as well. This layer may have a different refractive index than the core so as to contain light within the core. Localized N diffusion wells in the lower cladding layer 132 complete each PIN photodiode. Electrical contact with these wells is made via transmission line 118 to which each well is electrically coupled via N type dopant "vias" through the intervening layers.

FIG. 2 is an exploded isometric view of a portion of the converter in FIG. 1 showing a waveguide 138 and the photodiode 102. The proximal end of transmission line couples with the ridge 122 of photodiode 102 via metal bridge 200. The base of the P diffusion 210 at the base of the P ridge 122 is shown. The N well 212 in the lower cladding layer 132 is shown. The dopant via 214 coupling the N well to the proximal end 116 of the transmission line 136 via metal contact 202 is also shown.

FIG. 3 is a cross-sectional elevation of the waveguide and photodiode shown in FIG. 2 at section A–A'. The core 134, P ridge 122, and lower cladding 132 are substantially uniform in cross-section along the optical path. The absence of discontinuities reduces scattering of light and increases the efficiency and ease of fabrication for the device.

Figure 4:
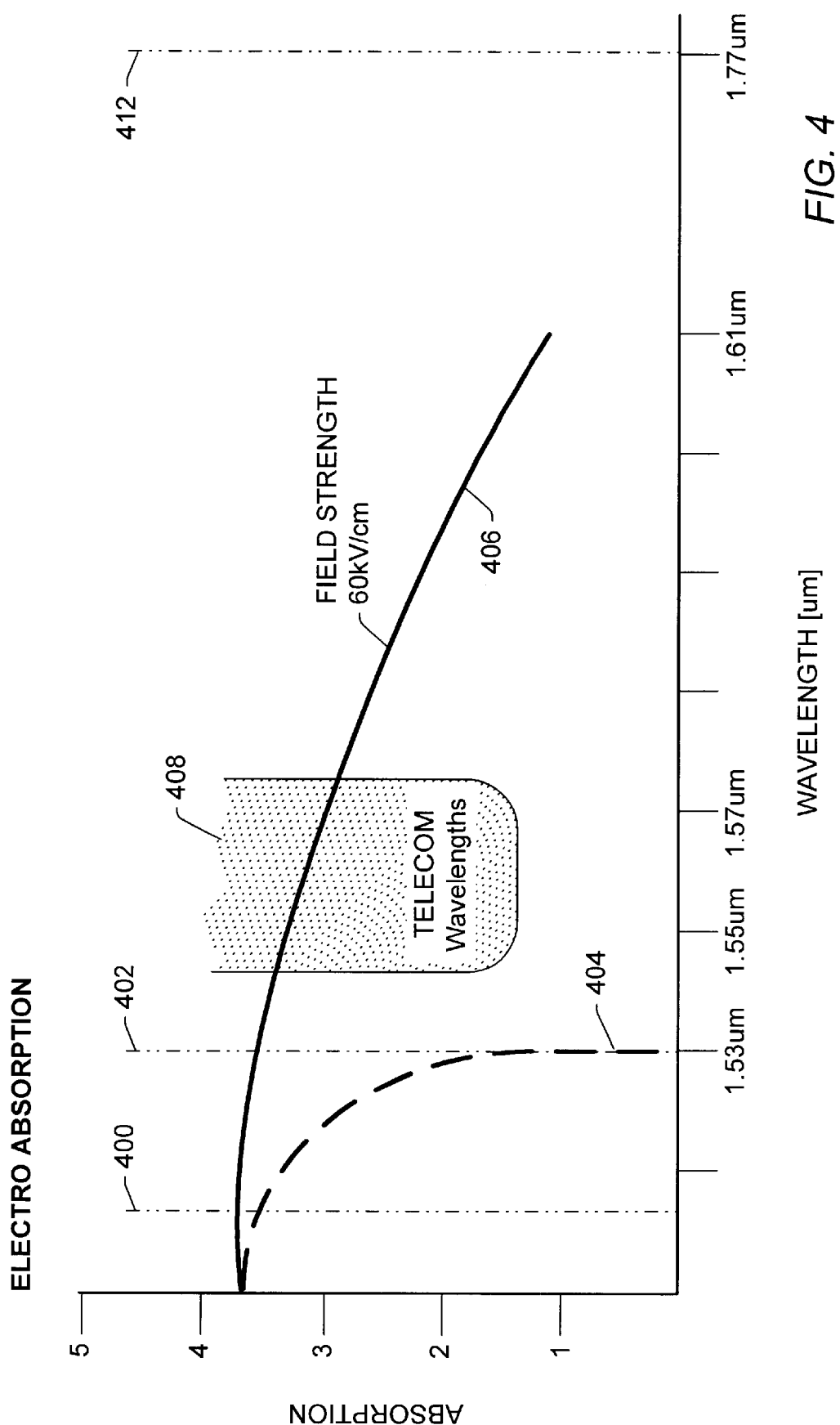
FIG. 4 is a graph showing electro absorption of a waveguide tuned to a selected bandgap as a function of electrical field strength within the waveguide.

FIG. 4 is a graph showing electro-absorption of a passive optical waveguide tuned to a selected bandgap as a function of electrical field strength within the waveguide. On the Y axis the absorption coefficient is shown. On the X axis wavelengths from below 1.53 um to 1.77 um are shown. Two lines 404 and 406 are plotted which demarcate the boundary between wavelengths which are absorbed and wavelengths which are transmitted for two different electrical field strengths in the waveguide core tuned to a bandgap 402 of 1.53 um. This bandgap lies just below (shorter wavelengths) the wavelength range 408 of interest (e.g., 1.55 um and 1.57 um), which are the prevalent wavelengths used for short and long haul optical telecommunications.

Line 404 corresponds with the case when little or no electrical field is present in the waveguide beneath the photodetector. In this instance, the optical core exhibits substantially zero absorption for all wavelengths to the right of line 404. This includes the above discussed telecom wavelengths 408 at 1.55 um and 1.57 um.

Line 406 corresponds to the case in which for the same passive optical waveguide tuned to the same bandgap 402 the electrical field strength in the portion of the core beneath the photodiode is increased to 60 kV/cm In this instance the telecom wavelengths fall on the left of the line and have substantial absorption coefficients, e.g. greater than 3000 inverse centimeters. This is sufficient to result in the conversion of photon energy into electron-hole pairs and the electrical currents resulting there from or vice versa in the case of a modulator.

The remaining bandgap lines 400 at 1.40 um for example and 410 at 1.77 um correspond with prior art approaches to waveguide fabrication. The prior art VMDP's exhibit at least two bandgaps along the optical transmission path in the optical waveguide. A first in the transmissive regions is displaced significantly from the wavelength range of interest toward shorter wavelengths, thus rendering the waveguide transparent to the wavelength range of interest. Conversely, under the photodetectors a second bandgap is utilized, this time positioned at significantly longer wavelengths than the wavelength range of interest. At these prior art bandgaps variations in the electrical field under the photodiodes have little or no effect on absorption since the primary factor affecting absorption is the physical discontinuities (e.g., quantum wells, etc.), which produce these bandgap variations. Additionally, the effect of using two bandgaps in the waveguide is to increase scattering of light and the fabrication complexity of the device.

In contrast the current invention maintains a substantially constant single bandgap along the length of the optical waveguide thus reducing discontinuities in the waveguide and increasing the efficiency and manufacturability of the device.

Figure 5:
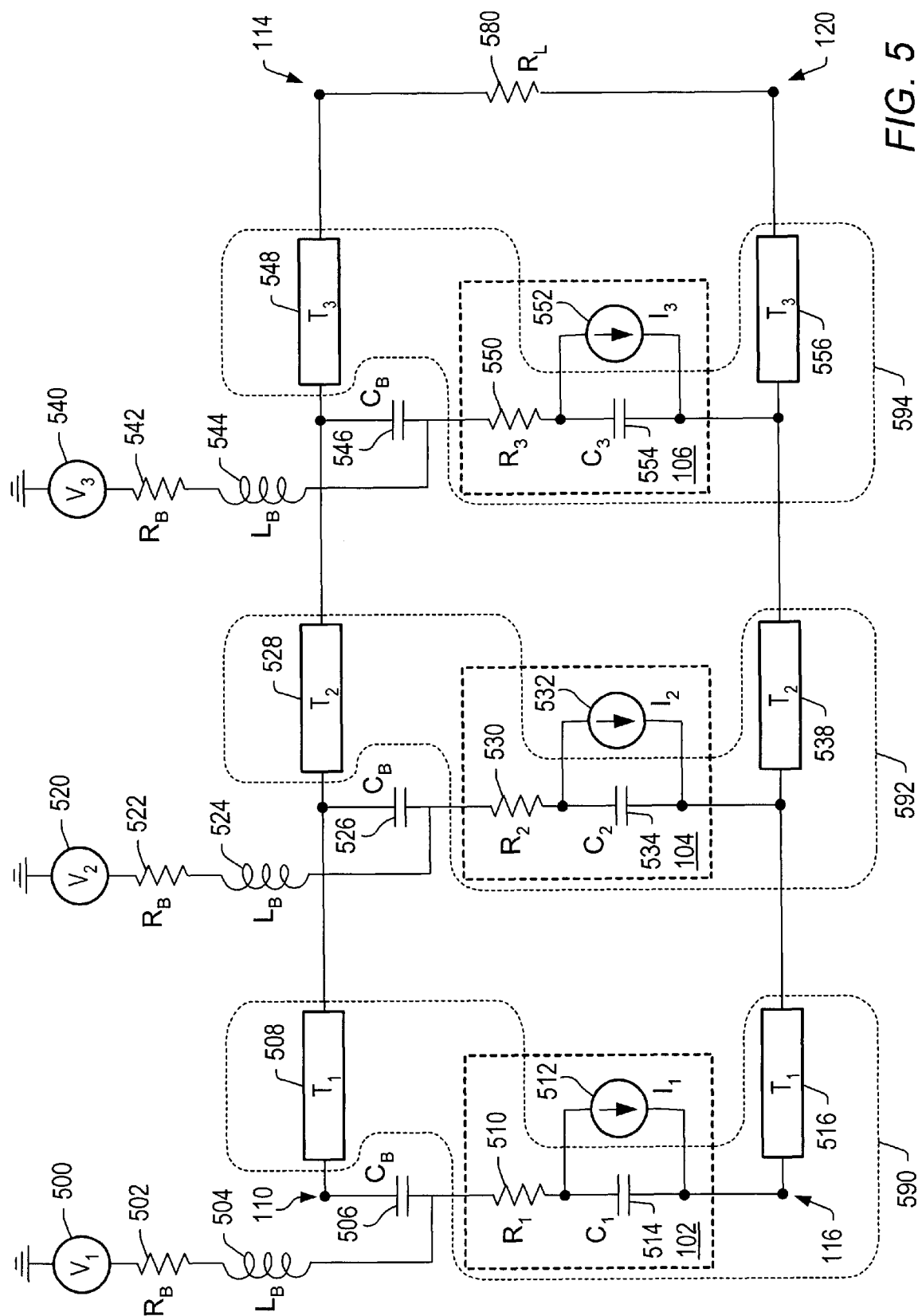
FIG. 5 is an electrical circuit diagram of the electro-optical converter shown in FIG. 1.
Figure 6:
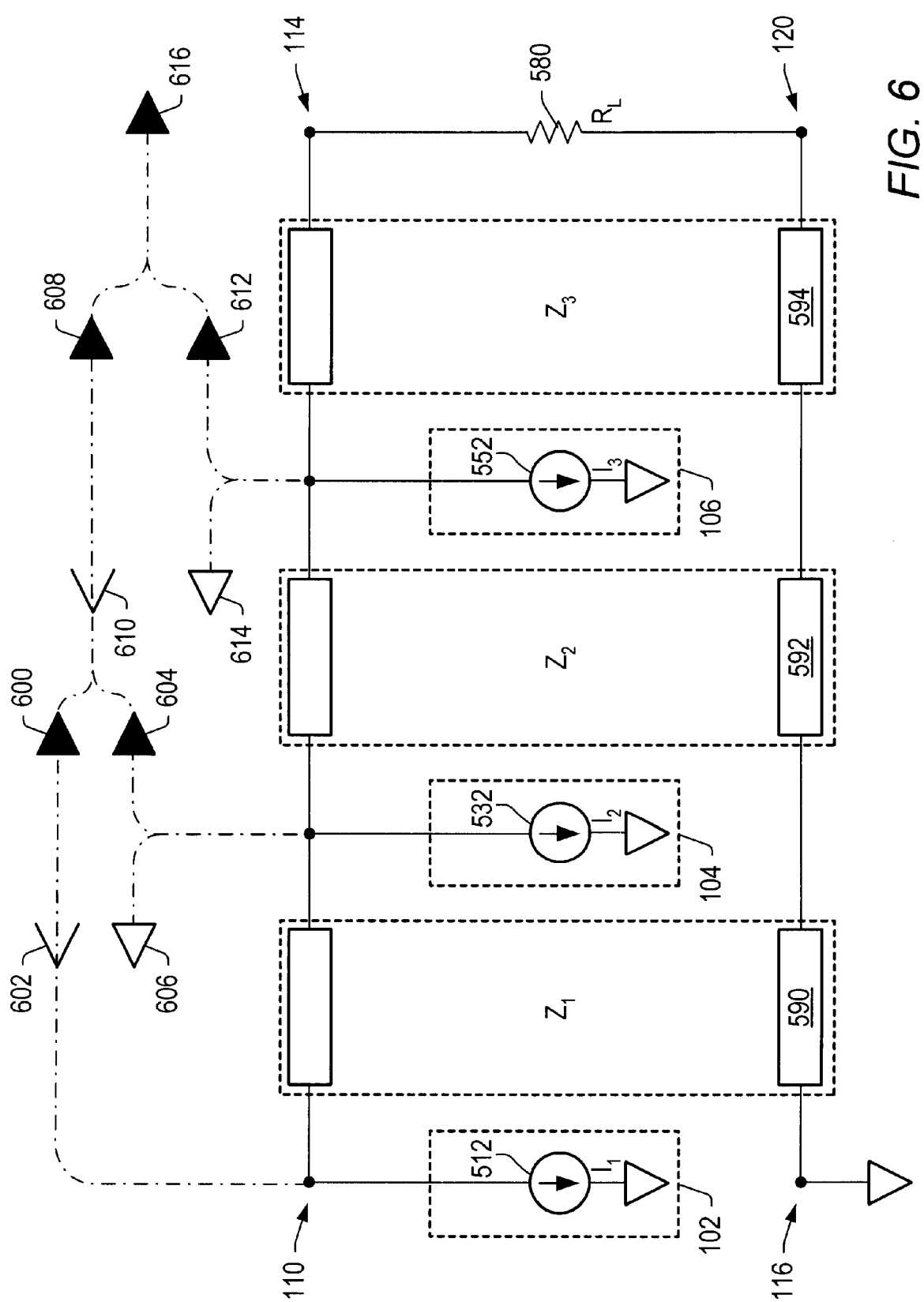
FIG. 6 is an electrical circuit diagram showing current flow and reverse current cancellation in the electro-optical converter shown in FIG. 1.

FIGS. 5–6 show different electrical views of the electro-optic converter shown in FIG. 1. In FIG. 5 the circuit is treated as an electrical circuit of discrete components, e.g. capacitor, resistor, inductor, current and voltage source, in FIG. 6 the circuit is modeled as a transmission line in which all components are expressed in terms of their impedances. The combined teachings of FIGS. 5–6 are twofold. First, scaling the impedances of the transmission line generates reflections from the plurality of photodiodes together with the electrical couplings there between which exhibit impedance mismatches with respect to one another. These electrical couplings in turn generate reflections of the electrical signal, which contribute to a cancellation of reverse traveling portions of the electrical signal. The result is that the dummy load required by the prior art velocity matched photodetectors is not required in an embodiment of the current invention in which such reflections are generated. Avoiding the use of the dummy load doubles the maximum theoretical efficiency of the current inventive VMDP as compared with prior art VMDPs. Second, by adding circuitry to individually alter the bias of each of the photodiodes it is possible to adjust the absorption of each of the photodetectors to balance or otherwise tune the electro-optic converter.

FIG. 5 is an electrical circuit diagram of the electro-optical converter shown in FIG. 1. The circuit is expressed as a set of three impedance blocks 590, 592, 594, which correspond to individual photodiodes 102, 104, 106 (See FIG. 1) and the associated electrical couplings, e.g., transmission line portions, there between. For each of these impedance blocks the associated variable bias circuits to adjust the bias on the individual photodiodes are shown.

The first impedance block 590 corresponds with photodiode 102 and associated transmission line portions 508, 516 with an impedance $T_1$. The photodiode is modeled as a resistor 510 with a resistance value $R_1$ coupled in series to the parallel combination of capacitor 512 with a capacitance of $C_1$ and current source 512 with a current of $I_1$. The current source is outside the impedance block. The photodiode 102 is direct coupled to the proximal end 116 of the lower portion of the transmission line and coupled via a DC blocking capacitor 506 with capacitance $C_B$ to the upper portion of the transmission line. The associated variable bias circuit includes a voltage source 500 with a value $V_1$. This voltage source is series coupled via resistor 502 with a value $R_B$ and inductor 504 with a value $L_B$ to the photodiode. These prevent the voltage source from loading down the node to which they are coupled.

The second impedance block 592 corresponds with photodiode 104 and associated transmission line portions 528, 538 with an impedance $T_2$. The photodiode is modeled as a resistor 530 with a resistance value $R_2$ coupled in series to the parallel combination of capacitor 534 with a capacitance of $C_2$ and current source 532 with a current of $I_2$. The current source is outside the impedance block. The photodiode 104 is direct coupled to the mid portion of the transmission line and coupled via a DC blocking capacitor 526 with capacitance $C_B$ to the upper portion of the transmission line. The associated variable bias circuit includes a voltage source 520 with a value $V_2$. This voltage source is series coupled via resistor 522 with the value $R_B$ and inductor 524 with the value $L_B$ to the photodiode. These prevent the voltage source from loading down the node to which they are coupled.

The third impedance block 594 corresponds with photodiode 106 and associated transmission line portions 548, 556 with an impedance $T_3$. The photodiode is modeled as a resistor 550 with a resistance value $R_3$ coupled in series to the parallel combination of capacitor 554 with a capacitance of $C_3$ and current source 552 with a current of $I_2$. The current source is outside the impedance block. The photodiode 104 is direct coupled to the mid portion of the transmission line and coupled via a DC blocking capacitor 546 with capacitance $C_B$ to the upper portion of the transmission line. The associated variable bias circuit includes a voltage source 540 with a value $V_3$. This voltage source is series coupled via resistor 542 with the value $R_B$ and inductor 544 with the value $L_B$ to the photodiode. These prevent the voltage source from loading down the node to which they are coupled.

FIG. 6 is an electrical circuit diagram showing current flow and reverse current cancellation in the electro-optical converter shown in FIG. 1. Each of the impedance blocks 590, 592, 594 corresponding with individual photodiodes 102, 104, 106 and associated electrical coupling portions, e.g., transmission line portions, are shown coupled in parallel to one another via upper and lower transmission line. The impedance blocks 590, 592, 594 have distinct impedances $Z_1$, $Z_2$, and $Z_3$, respectively. Adjacent each impedance block the associated current source for each photodiode is shown. The currents generated by the current sources need not be, and normally would not be equal to one another. Adjacent each impedance block the associated current source for each photodiode is shown. The currents generated by the current sources need not be, and normally would not be equal to one another.

At the proximal end of the transmission lines, end points 110, 116 (See FIG. 1) are not coupled to a dummy load, since the scaling of the impedance blocks generates the desired reflections 602 and 610 which substantially cancel reverse current flow 606 and 614 within the transmission line. The load 580 with a value RL is shown coupled to the distal ends 114, 120 of the transmission line.

Arrow 600 corresponds to the forward current flow from photodetector 102 and arrow 602 is the reflection of that current flow resulting from the impedance mismatch between impedance blocks 590–592. Arrow 604 corresponds to the forward current flow from photodiode 104 and arrow 606 is the reverse current flow from that photodiode. Arrow 608 corresponds to the forward current flow from photodetectors 102–104 and arrow 610 is the reflection of that current flow resulting from the impedance mismatch between impedance blocks 592–594. Arrow 612 corresponds to the forward current flow from photodiode 106 and arrow 614 is the reverse current flow from that photodiode. Arrow 616 is the total forward current flow along the transmission line.

The following example addresses the appropriate scaling for the impedances to generate reflections which cancel reverse current flow, thereby doubling the theoretical efficiency of the electro-optic converter.

EXAMPLE 1

Equal Current Flows from Each Photodetector.

In this example the current flows from each of photodiodes 102–106 are assumed to be equal for purposes of clarity. Thus $I_1=I_2=I_3$ are equal. Proper scaling requires $$Z_{n+1} = Z_n \left( \frac{n}{n+1} \right).$$

Starting with an arbitrary impedance of $Z_0$ for impedance block 590, the impedances for impedance blocks 592 and 594 would be $Z_0/2$ and $Z_0/3$ respectively. The appropriate values for the forward and reverse currents shown in FIG. 6 would then be as follows.

The forward current flow from photodetector 102 corresponds with arrow 600 and has a value of $4/3I_1$. Arrow 602 is the reflection of that current flow resulting from the impedance mismatch between impedance blocks 590–592 and has a value of $-1/3I_1$. Arrow 604 corresponds to the forward current flow from photodiode 104, i.e., $2/3I_1$, and arrow 606 is the reverse current flow, $1/3I_1$, from that photodiode. The reverse current from photodiode 104 and the reflected current from photodiode 102 thus cancel one another. Arrow 608 corresponds to the forward current flow from photodetectors 102–104, i.e., $2I_1$, and arrow 610 is the reflection, i.e., $-2/5I_1$, of that current flow resulting from the impedance mismatch between impedance blocks 592–594. Arrow 612 corresponds to the forward current flow, i.e., $3/5I_1$, from photodiode 106 and arrow 614 is the reverse current flow, i.e., $2/5I_1$, from that photodiode. Thus, the reverse current flow 614 and the reflected current 610 cancel one another. The remaining current flow corresponds with arrow 616 and is the total forward current flow, $3I_1$, along the transmission line.

For the more complex case where current flow from the individual photodiodes is not equal the following equations and associated discussion provide a solution to the scaling of the impedance mismatches required between impedance blocks 590–594. The general rule is that at each section, $$z_m = \frac{1}{1 + i_m},$$

where $Z_m$ is the ratio of effective electrical wave impedance $Z_{n+1}/Z_n$ and $$i_m = \frac{I_{n+1}}{\sum_{k=1}^{n} I_k}.$$

Where $i_m$ is a parameter that is dependent on the current distribution. The individual photodiode element currents, $I_n$ are in turn determined by the length, l and absorption coefficient, $\alpha(V)$ of the photodiodes as well as the excess loss, B. Specifically, each photodiode element has absorption $A_k=\alpha(V)l_k$ and responsivity, $R=\lambda A_k/1.24$.

$$I_n = P_{in} \frac{\lambda}{1.24} \alpha(V) l_n \prod_{k=1}^{n-1} (1 - \alpha(V) l_k) B_k$$

In addition, the photodiode capacitance is also dependent on the photodiode length. The design of each interconnecting transmission line section is dependent on the photodiode capacitance and required effective wave impedance.

$$Z_n = \frac{\tau}{CL_n + C_n},$$

where CL is the interconnecting transmission line capacitance, τ is the required time delay to match the optical wave, and Cn is the photodiode capacitance, $$C_n = \frac{\varepsilon w l_n}{d}$$

Selecting the proper photodiode lengths can be accomplished utilizing the following design procedure:

1) Pick the highest value of effective wave impedance, e.g. 150–200 ohms. This is $Z_1$.
2) Decide on an initial current distribution $I_n$. Practical possibilities require the $I_n$ to decrease with n. The distribution is tailored as a compromise between uniform distribution and easily realizable photodiode lengths.
3) Plug the current distribution, $I_n$, into $$I_n = P_{in} \frac{\lambda}{1.24} \alpha(V) l_n \prod_{k=1}^{n-1} (1 - \alpha(V) l_k) B_k$$

along with known photodiode absorption and waveguide excess loss per section, to come up with the required distribution of photodiode lengths, $I_n$. This equation grows in complexity with n. By starting with n=1, the photodiode lengths are easily calculated. If things aren't working out very nicely, alpha can be adjusted using the photodiode voltage. However, this shouldn't be used excessively since regulating too many independent voltages will increase complexity.

4) Calculate the photodiode capacitances, Cn
5) Plug the desired current distribution into $$i_{rn} = \frac{I_{n+1}}{\sum_{k=1}^{n} I_k}$$

to determine the irn parameters.

6) Use the Irn parameters to calculate the required effective wave impedances to provide current cancellation $$z_{rn} = \frac{1}{1 + i_{rn}}.$$

Calculate the required effective wave impedance for a section by multiplying zrn by the previous impedance, starting with that chosen in 1). That is Z2=Z1*zr1, etc.

7) Plug the required wave impedance and photodiode capacitance into $$Z_n = \frac{\tau}{CL_n + C_n}$$

to determine the interconnecting transmission line capacitance.

8) Calculate the interconnecting transmission line inductance to match the known optical delay per section $$\tau = \sqrt{L(CL_n + C_n)}.$$

9) The capacitance and inductance from 7 and 8 along with the physical distance between photodiodes completely define the electrical transmission line.

The photodiode lengths completely define the photodiodes since the width is set by the ridge 122 and the thickness is set by the carrier transit time requirement.

In an alternate embodiment of the invention the number of photodiodes may range from 2 to 50.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A converter for converting between an optical signal and an electrical signal, the converter comprising:
   a passive optical waveguide for conveying the optical signal; and
   a plurality of photodiodes optically coupled in series with said passive optical waveguide and electrically coupled in parallel to one another with electrical couplings to convey the electrical signal there between, wherein the plurality of photodiodes together with the electrical couplings there between exhibit impedance mismatches with respect to one another that generate reflections of the electrical signal, and wherein the reflections of the electrical signal contribute to a cancellation of reverse traveling portions of the electrical signal.

2. The converter of claim 1, wherein said passive optical wave guide further comprises:
   a core section exhibiting a substantially uniform cross-sectional profile along an optical path of the optical signal.

3. The converter of claim 1, wherein said passive optical wave guide further comprises:
   a core section exhibiting a substantially uniform effective refractive index along an optical path of the optical signal.

4. The converter of claim 1, wherein said passive optical waveguide further comprises:
   a core section with a selected band gap that exhibits substantial transparency to a characteristic wavelength of the optical signal at a first electrical field strength and exhibits substantial absorption of the optical signal at a second electrical field strength greater than the first electrical field strength.

5. The converter of claim 4, wherein a bias voltage applied to each of said plurality of photodiodes generates the second electrical field strength within portions of said core section adjacent said photodiodes.

6. The converter of claim 4, wherein said core comprises at least one of: GaAs, InGaAs, AlGaAs, InAlAs, and InGaAsP.

7. The converter of claim 4, wherein said plurality of photodiodes comprise PIN photodiodes.

8. The converter of claim 1, wherein said plurality of photodiodes together with the electrical couplings there between further exhibit individual reactances selected to substantially match a group velocity of the electrical signal with a group velocity of the optical signal within said passive optical waveguide.

9. The converter of claim 1, wherein said plurality of photodiodes further comprise:
   a plurality of bias circuits, wherein each bias circuit is coupled to a corresponding one of said plurality of photodiodes to vary an opto-electric coupling between a core section of said passive optical waveguide and the corresponding one of said plurality of photodiodes.

10. The converter of claim 1, further comprising:
    a microwave transmission line which electrically couples said plurality of photodiodes in parallel to one another.

11. The converter of claim 10, wherein portions of said microwave transmission line coupling pairs of said plurality of photodiodes to one another exhibit impedance mismatches with respect to one another that generate reflections of the electrical signal, and wherein the reflections of the electrical signal contribute to a cancellation of reverse traveling portions of the electrical signal.

12. The converter of claim 1, wherein the converter is used for detecting an optical beam modulated with said optical signal to generate the electrical signal.

13. A converter for converting between an optical signal and an electrical signal, the converter comprising:
    a passive optical waveguide for conveying the optical signal, wherein the passive optical waveguide comprises a selected band gap that exhibits substantial transparency to a characteristic wavelength of the optical signal at an electrical field strength less than a first electrical field strength and exhibits substantial absorption of the optical signal at an electrical field strength greater than the first electrical field strength;
    a plurality of photodiodes displaced from one another along said passive optical waveguide, wherein said plurality of photodiodes are electrically coupled in parallel with one another to convey the electrical signal there between; and
    bias circuits coupled to a corresponding photodiode of the plurality of photodiodes, wherein a bias voltage applied by each of the bias circuits to each of the plurality of photodiodes generates within said passive optical waveguide localized electric fields with the electrical field strength greater than the first electrical field strength to optically couple said plurality of photodiodes with said passive optical waveguide.

14. The converter of claim 13, wherein said plurality of photodiodes together with electrical couplings there between further exhibit individual reactances selected to substantially match a group velocity of the electrical signal with a group velocity of the optical signal within said passive optical waveguide.

15. The converter of claim 13, wherein said plurality of photodiodes together with electrical couplings there between further exhibit individual impedance mismatches with respect to one another that generate reflections of the electrical signal, and wherein the reflections of the electrical signal contribute to a cancellation of reverse traveling portions of the electrical signal.

16. The converter of claim 13, wherein the converter is used for modulating an optical beam within said passive optical waveguide with the electrical signal to generate the optical signal.

* * * * *